(12) United States Patent
Tan-Torres, Jr.

(10) Patent No.: US 8,131,613 B2
(45) Date of Patent: Mar. 6, 2012

(54) PENSION LIABILITY ALLOCATION

(76) Inventor: Antonio L. Tan-Torres, Jr., Audubon, PA (US)

( * ) Notice: Subject to any disclaimer, the term of this patent is extended or adjusted under 35 U.S.C. 154(b) by 191 days.

(21) Appl. No.: 11/385,397

(22) Filed: Mar. 21, 2006

(65) Prior Publication Data

US 2007/0226111 A1 Sep. 27, 2007

(51) Int. Cl.
*G06Q 40/00* (2006.01)
(52) U.S. Cl. .......................................................... 705/35
(58) Field of Classification Search ...................... 705/35
See application file for complete search history.

(56) References Cited

U.S. PATENT DOCUMENTS

| | | | |
|---|---|---|---|
| 6,219,650 B1* | 4/2001 | Friend et al. ................. | 705/36 R |
| 6,336,103 B1* | 1/2002 | Baker .......................... | 705/36 R |
| 7,519,552 B2* | 4/2009 | Phelps ............................. | 705/35 |
| 7,860,773 B1* | 12/2010 | Golden ........................ | 705/36 R |
| 2002/0103852 A1* | 8/2002 | Pushka ........................... | 709/203 |
| 2003/0074229 A1* | 4/2003 | Heise et al. ....................... | 705/4 |
| 2003/0182147 A1* | 9/2003 | Mahoney et al. ................. | 705/1 |
| 2004/0148248 A1* | 7/2004 | Allen et al. ...................... | 705/37 |
| 2004/0230505 A1* | 11/2004 | Garlich et al. .................. | 705/35 |
| 2005/0080698 A1* | 4/2005 | Perg et al. ........................ | 705/35 |
| 2005/0187801 A1* | 8/2005 | Phelps .............................. | 705/4 |
| 2005/0228731 A1* | 10/2005 | Coates ............................ | 705/35 |
| 2005/0234796 A1* | 10/2005 | Lipper ............................ | 705/36 |
| 2006/0059075 A1* | 3/2006 | Hurewitz ........................ | 705/37 |
| 2006/0080199 A1* | 4/2006 | Tarbox et al. ................... | 705/35 |
| 2006/0167777 A1* | 7/2006 | Shkedy ............................ | 705/35 |
| 2006/0271453 A1* | 11/2006 | Landle et al. ................... | 705/35 |
| 2007/0005471 A1* | 1/2007 | Ho et al. .......................... | 705/35 |
| 2007/0011069 A1* | 1/2007 | Bevacqua, Jr. .................. | 705/35 |
| 2007/0156555 A1* | 7/2007 | Orr .................................. | 705/35 |
| 2007/0162380 A1* | 7/2007 | Conroy ........................... | 705/38 |
| 2008/0243667 A1* | 10/2008 | Lecomte ......................... | 705/37 |

OTHER PUBLICATIONS

Timothy M. Craft, "How Funding Ratios Affect Pension Plan Portfolio Allocations," Journal of Real Estate Portfolio Management, Boston: Jan.-Apr. 2005, vol. 11, Iss. 1, pp. 29-35 ("Craft").*
Michael J. Bazdarich, "Separability and Pension Optimization," The Journal of Fixed Income, New York: Winter 2006, vol. 16, Iss. 3; pp. 60-69.*
Journal of Real Estate Portfolio Management, Boston, Jan.-Apr. 2005, vol. 11, Issue. 1, p. 29, 7 pages, "How funding Ratios Affect Pension Plan Portfolio Allocations" by Timothy M. Craft.*
Separability and Pension Optimization Michael J. Bazdarich The Journal of Fixed Income. New York: Winter 2006. vol. 16, Issue. 3, p. 60, 9 pages.*
On the Management of Financial Guarantees Robert C. Merton, Zvi Bodie, Financial Management, V. 21, n4, pp. 87-109, Winter 1992, ISSN: 0046-3892.*

* cited by examiner

*Primary Examiner* — Bruce I Ebersman
(74) *Attorney, Agent, or Firm* — Caesar, Rivise, Bernstein, Cohen & Pokotilow, Ltd.

(57) ABSTRACT

A method of setting pension plan investment policy, overlay derivative strategy and other pension policies, initiated by the calculation of a ratio for any existing, putative or alternative asset portfolio of a pension fund with specific reference to the pension plan's liabilities. The method's calculated ratio X/Y, referred to as the "pension fund liability allocation" or "pension liability allocation" for any portfolio under consideration indicates that X % of pension liabilities are hedged by an equal dollar amount of pension assets and Y % of pension liabilities are unhedged by the remaining pension plan assets. The ratio X/Y may also be used to assess and compare risk between pension plans of different entities. The pension liability allocation is a concise metric indicating the pension fund's degree of asset/liability mismatch risk.

2 Claims, 6 Drawing Sheets

PENSION LIABILITY ALLOCATION

BACKGROUND OF THE INVENTION

The invention relates to the field of financial risk management, particularly to evaluation and selection of investment portfolio asset allocations and other policies for defined benefit pension and retirement plans relative to the pension/retirement plans' liabilities.

Defined benefit pension funds in the corporate and public sectors promise specified amounts of benefits to participants upon reaching allowed retirement ages, as well as satisfying minimum service requirements. The promised benefit generally depends on the age at retirement, years of service, and may also depend on the participant's compensation over a specified period of employment. The financial obligation of the pension fund may be deferred for an extended period of time before actual payments are made; at the extreme, a new 20-year old participant may wait 45 years before receiving any pension payments from the fund. To avoid excessive cash requirements when benefits become due in the future and to take advantage of tax incentives available in the tax code for corporate plans, plan sponsors pre-fund the obligation, resulting in significant asset pools that need to be invested appropriately.

In the process of managing pension plan assets, plan trustees, investment committee members and investment consultants make recommendations and decisions regarding issues such as the fund's asset allocation, overlay investment strategies, choice of investment managers, the timing of such decisions. Academic studies (Brinson, et. al., 1986, 1991) have shown asset allocation explaining over 90% of the variation of pension plan returns. At its basic level, an asset allocation labeled as 60/40 indicates that 60% of the pension assets are invested in equity or equity-like investments, while the remaining 40% of assets are invested in bonds or bonds-like securities. However, it is common to refine the 60% equity allocation to more detailed sub-allocations; for example, the 60% may be further partitioned into 40% US Large Cap equities, 10% US Small Cap equities and 10% International equities. A similar refinement is generally done for the bond allocation (40% in the prior example) among bond sub-allocations.

The asset allocation policy is arguably the most important decision in managing pension fund assets. The process of setting a pension fund allocation generally involves the comparison of the existing policy with a number of candidate asset allocations. There is a wide variety of processes in coming up with these alternative asset allocations. One approach relating to the basic level described in the previous paragraph involves permutations of the 60/40 ratio. That is, an alternative portfolio may be generated by specifying a 50/50 target; this is done by allocating 50% of the assets to equities and the remaining 50% to bonds. Another approach is to select candidates from calculated efficient frontiers, using the optimization process pioneered by Markowitz (1952). This approach is generally applied to the approach where sub-allocations to equity and bonds are used. The optimization takes the form of allocating funds or portfolio weights to a number of asset classes, with the objective of maximizing reward for a fixed risk level, or minimizing risk for a fixed reward level.

In addition to allocating to various asset classes, the investment committee can also take advantage of a myriad of investment strategies that may be overlaid on the asset class choices. For example, active management rather than passive management and alpha transport may be implemented over a portion of the funds. Moreover, investment overlays may also be used on pension liabilities, such as interest rate swaps and futures to manage interest rate risk.

In addition to setting investment policies and strategies, plan sponsors also make decisions on additional defined benefit plan policies. Additional policies that require consideration are pension plan employer contribution funding policy, pension plan benefit policy, and actuarial methods and assumptions policy.

In selecting an asset allocation, overlay investment strategies and other pension plan policies, individuals responsible for the decision compare several financial measures involving risk and return for each of the allocations, strategies and alternative policies under consideration. For evaluating investment reward, frequently used measures are the expected investment returns over single and multiple years. Generally, the investment return is supplemented by additional metrics, such as expectations with respect to required pension plan contributions, accounting expense, dollar surplus, funded ratio. These additional measures are calculated relative to a variety of pension liabilities used by actuaries. For evaluating risk, measures include standard deviation, variance, downside risk measures (Harlow, 1991), specific percentiles of the statistical distribution of the metric (for example, $5^{th}$ or $95^{th}$ percentile). A third set of asset allocation comparative metrics are derived by taking the ratio of the reward measures over their corresponding risk measures, deriving efficiency measures. The above measures can be calculated over one and multiple years.

Other parties of interest such as stock, sector or industry analysts in the investment field evaluate risk of pension plans of publicly-traded companies that they cover, due to the increasing impact of the pension fund on the financial well-being of the enterprise. In Dec. 2003, the Financial Accounting Standard Board (FASB) revised Financial Accounting Standard 132 ("Employers' Disclosures About Pensions and Other Post-Retirement Benefits"). A new requirement was the disclosure of the pension plans' asset allocation policy. Another party that monitors pension risk would be pension regulators such as the Pension Benefit Guaranty Corporation (PBGC) which is responsible for guaranteeing pension payments in the US private sector. A similar agency in the United Kingdom (UK) would be the UK Pension Protection Fund. Rating agencies following the financial health of states, cities and municipalities also follow closely the pension funds in the public sector.

An increasing number of corporate and state defined benefit plans are currently in difficult underfunded situations; the situation was initiated by the so-called "pension perfect storm" of 2000-2002, where equity markets earned negative returns, while long yields declined to historical lows, thereby depressing discount rates and raising pension liabilities. The problems persist today, leading many plans to close to new entrants, as well as freeze existing benefits for ongoing participants. Plan sponsors are hoping that such moves will alleviate the level and volatility of required cash contributions as well as pension accounting expense. Moreover, in 2006, expected pension funding reform from Congress and pension accounting changes from the FASB are expected to exert even more pressure on plan sponsors.

Even though there is still considerable debate on whether there are excessive allocations to equities in pension asset portfolios, it is clear that the potential adverse impact of equity volatility on pension funds was unexpected and greatly underestimated, especially after the equity bull market of the 1990's. Unfortunately, plan sponsors have only belatedly realized that it is pension surplus or deficit that matters, not asset levels or return alone. However, even though plan sponsors are taking steps to ease the volatility as described in the prior paragraph, the existing pension liabilities are still very much significant and will require continued risk management over the next decades. The ability of plan sponsors to precisely understand investment consequences on pension surplus will largely drive investment and other pension policy decisions and the consequent financial condition of the pension plan, and the plan sponsor enterprise as well.

As describe above, the current method of constructing portfolio candidates involves the assignment of pension assets to asset classes; that is, for example, given a pension plan with $1,000 million in assets, the plan sponsor can assign $700 million or 70% of assets to the equity bucket asset class, and the remaining $300 M or 30% to bonds bucket asset class. Optimization routines also follow this process in the process of searching for the optimal allocation. Thus, the term: asset allocation. Clearly, the assignment of assets in this process did not involve the pension liabilities. Only during the stage of comparing metrics of candidate portfolios, overlay strategies and alternative policies did pension liabilities hopefully enter, through the measures involving pension funded ratios, contributions and accounting expense. The process, in some respect, suffers from the proverbial adage of "putting the cart before the horse".

BRIEF SUMMARY OF THE INVENTION

The invention covers a method of setting pension plan investment policy, derivative overlay strategies and other pension policies, where the method is initiated by the calculation of a ratio x/y referred to as the pension liability allocation x/y, where x is indicative of pension liabilities that are hedged by pension assets and y is indicative of pension liabilities that are not hedged by of pension assets. The pension liability allocation is then used as one of the metrics in evaluating and comparing alternative policies and strategies. The pension liability allocation ratio may also be used in determining at least in part the alternative pension policies and strategies that are to be included in the evaluation and comparison. In selecting alternative policies and strategies, optimization may be used. The pension liability allocation ratio may be integrated in the optimization process, and the resulting efficient frontier may be termed as the "pension liability allocation efficient frontier". With respect to investment analysts, credit rating agencies and pension regulatory agencies, the pension allocation ratio may also be used by such parties in assessing and comparing risk from pension plans of different entities.

The invention covers different calculation methods for the values x and y in the pension liability allocation ratio. In one aspect of the invention, the condition of perfect or near-perfect hedging of liabilities is required to increment the value x. In another aspect of the invention, both values x and y may be incremented depending on the extent of hedging of liabilities provided by the different assets of the plan. In yet another aspect of the invention, both values of x and y may be incremented depending on correlations of paired assets and liabilities, weighted by the size of the pairing.

The invention can also be used in the context of other retirement related benefits, such as post-retirement medical and insurance benefits that are commonly provided by private and public employers. Moreover, the invention can be extended to cover enterprise liabilities that are uncertain and contingent on factors that may be hedged in varying degrees by available enterprise assets assigned to cover such liabilities.

In addition to the method, a computer software product for use on a computer system to implement the method is developed. The software is designed to perform the steps specified in the Detailed Description.

The invention's other features and advantages will be apparent from the following detailed description, and from the claims. The details of one or more aspects of the invention are presented in the accompanying drawings and the description below. Other features, objects, and advantages of the invention will be apparent from the description and drawings, and from the claims.

DETAILED DESCRIPTION OF THE INVENTION

The understanding of following discussion of the invention will be facilitated by reference to the prior drawings.

1. Pension Asset Allocation and Pension Liability Allocation Methods

Figure 1:
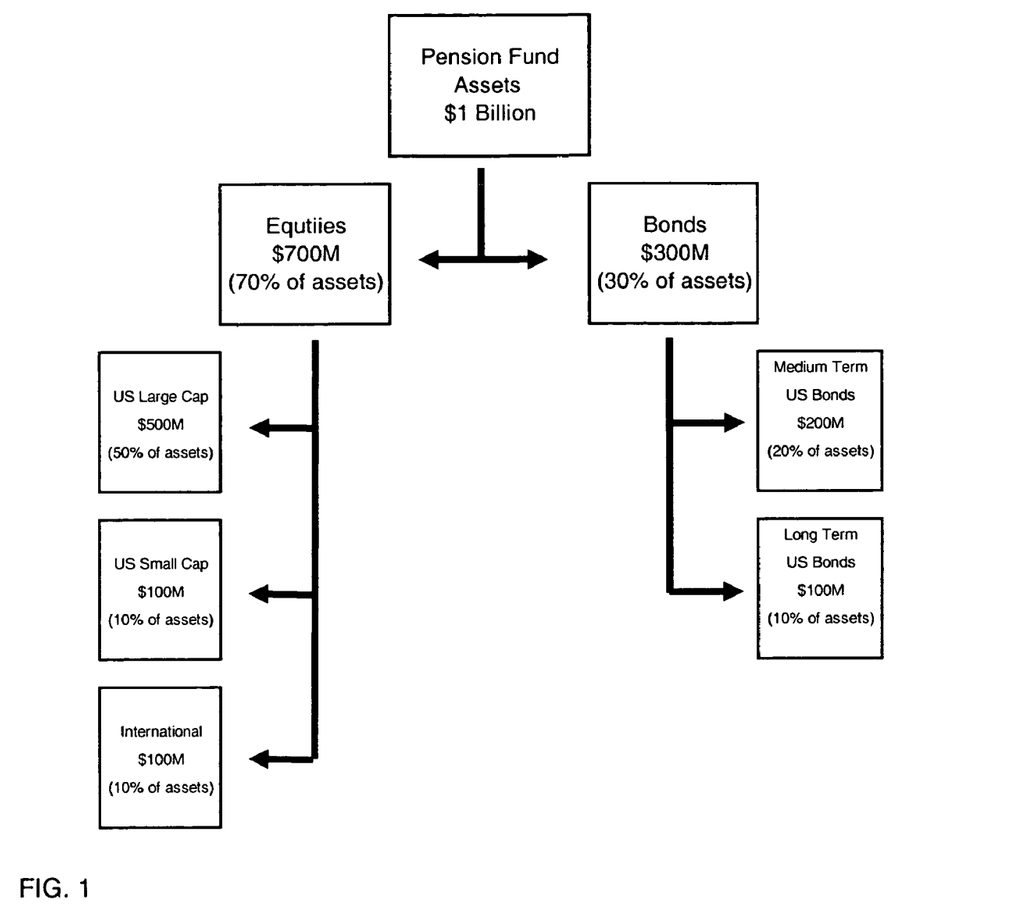
FIG. 1 depicts an example illustrating the process of allocating pension funds to selected asset classes for a given asset allocation policy.

FIG. 1 illustrates an example of the process of asset allocation. In this particular example, the pension fund is reviewing its investment policy, and the plan's Investment Committee has decided to consider a 70/30 asset allocation as one of the candidate portfolios among several. The asset allocation process involves the placement of $700 million (or 70% of assets) in the equity asset class, which is then further sub-allocated between US Large Cap equity ($500 million or 50% of assets), US Small Cap equity ($100 million or 10% of assets) and International equity ($100 million or 10% of assets). The remaining $300 million is allocated to the bonds asset class, which is sub-allocated to US medium-term bonds ($200 million or 20% of assets) and US long-term bonds ($100 million or 10% of assets). A similar process is performed for other alternative asset allocations, say 50/50 or 60/40. All references relate to dollars of assets or percent of total assets. In setting such alternative policies, it is clear that asset allocation does not involve the pension liabilities which the funds will ultimately need to meet. Hopefully, the specific pension liabilities are considered in the evaluation stage; generally, this is done by comparing metrics of candidate portfolios regarding pension surplus, funded ratio, surplus return, pension cash funding and accounting expense. These comparative measures may deal with expected levels (including mean, median) or volatility (including standard deviation, variance, semi-variance, downside risk, $5^{th}$ percentile) or ratios thereof. However, significantly more attention is still placed on asset-return measures, whether annual (one-year)

or compound (multi-year). The asset allocation process remains asset-centric, which may prove counter-productive in the current situation where pension surplus risk management is paramount.

Figure 2:
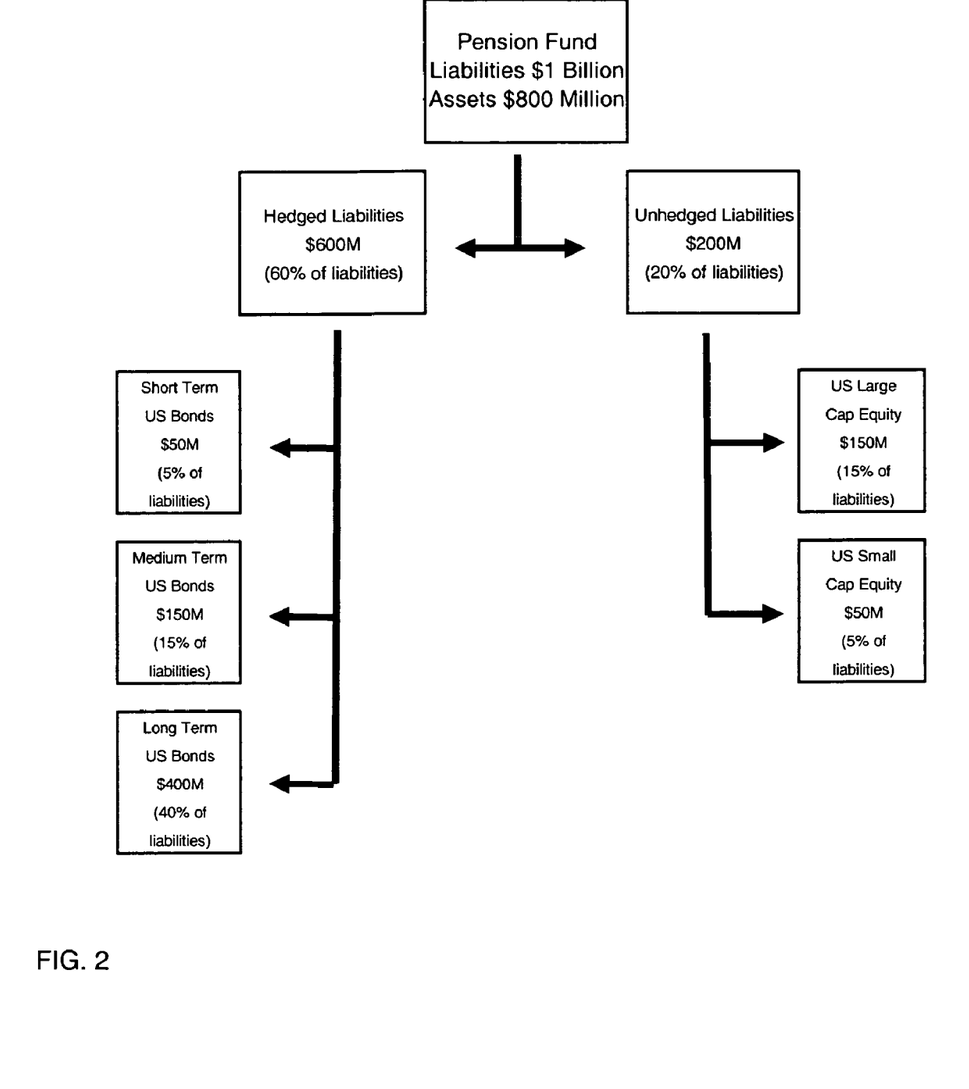
FIG. 2 depicts an example illustrating the process of allocating pension funds between hedge and unhedged pension liabilities for a given liability allocation policy.

The intent of FIG. 2 is to illustrate the liability allocation method. FIG. 2 depicts an example of the method of liability allocation. In this particular example, the pension fund has total liabilities of $1 billion, with assets of $800 million. In its investment strategy review, the plan investment committee has decided to use the liability allocation method. One of the investment strategy alternatives considered is a 60/20 liability allocation. At this point of selecting candidate portfolios, pension liabilities are already considered in the asset portfolio construction. In this aspect of the method, references are not made with respect to dollars or percentage of assets but to dollars or percentage of liabilities. Thus, following the steps outlined later in this section, the asset portfolio in this aspect of the method is constructed with $600 M in various durations of bonds ($50 million of short-term bonds, $150 million of medium-term bonds and $400 million of long-term bonds) to match $600 million (or 60% of liabilities). The remaining $200 million in assets (equal to 20% of liabilities) are knowingly allocated to equities, and consequently allocated to unhedged liabilities. The definition of hedged and unhedged are explained below, including possible gradations between hedged and unhedged (rather than the binary choices of hedged versus unhedged). However, it is worth pointing out that based on a continuous scale between 100% unhedged and 100% hedged, it is possible to have a 60/20 liability allocation with a lower (but longer) asset allocation to bonds and more asset allocations to equities, all relative to the example in FIG. 2. The implication is that under this aspect of the method, a single liability allocation can easily have different portfolio implementations with differing asset allocations to equities and bonds.

Recently, relatively newer asset classes such as hedge funds, private equity, commodities have been included in pension portfolios. There is a lack of clarity, especially for hedge funds, in classifying assets allocated to these newer classes between equities and bonds. In this aspect of the liability allocation method, there is no confusion, as any asset class or security under consideration is categorized on its ability or inability to hedge specified pension liabilities.

2. Use of the Liability Allocation Method in Setting Investment Strategy and Other Pension Policies In one aspect of the method, the process of selecting an investment strategy for a pension plan may proceed by comparing alternative liability allocations. Alternative allocations together with the corresponding portfolio implementation may be constructed with simple permutations of the hedged/unhedged ratio, possibly centered on the derived liability allocation of the current asset allocation policy. Thus, for example, if the current asset allocation policy translates into a 30/70 liability allocation, alternative liability allocations such as 20/80, 40/60 or 50/50 may be considered.

Figure 3:
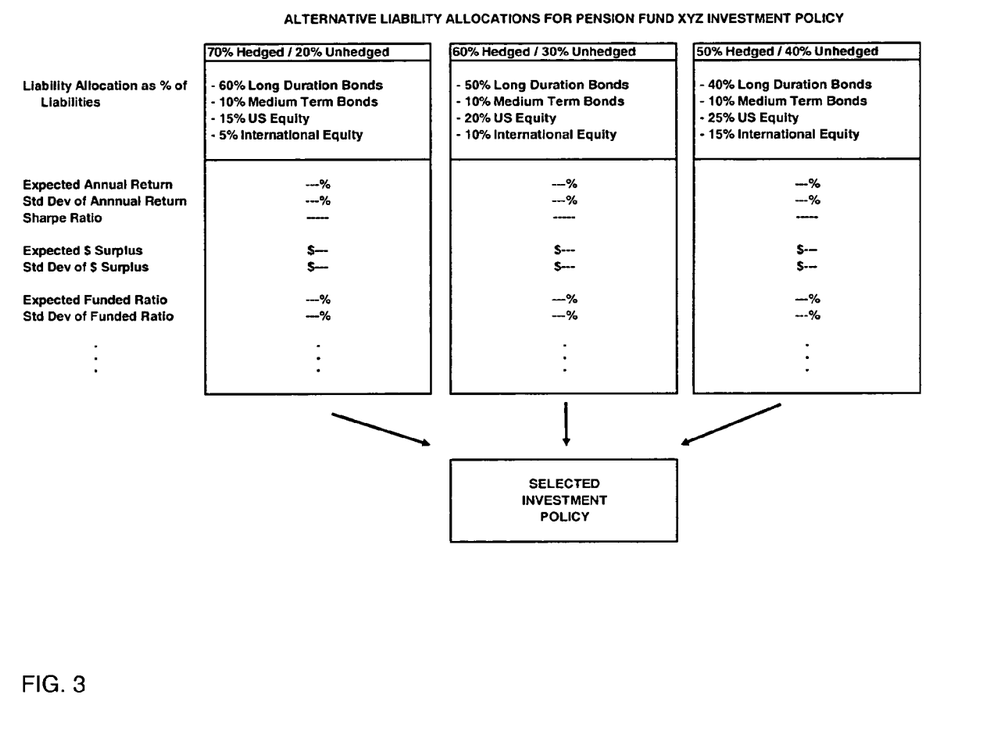
FIG. 3 depicts an example of the process of selecting a single liability allocation from a number of candidate liability allocations in order to set a pension plan's liability allocation and investment policy.

FIG. 3 shows an example of how this investment strategy setting may proceed using pension liability allocations. Portfolios may also be selected using optimization routines that assure the maximum reward for a specified level of risk (or minimum risk for a specified reward). Possible risk/reward measures for the liability allocation efficient frontier may include the level and volatility of surplus return, dollar surplus or funded ratio. Further details on the possible generation of the liability allocation efficient frontier follow below. Annual and compound asset return measures as well as the asset allocation ratio may supplement the comparison of alternative liability allocation strategies. From the current and alternative liability allocations, plus the various risk and reward metrics, the investment committee may select one of the liability allocations and its corresponding portfolio implementation as the pension plan's ongoing investment policy.

In calculating liability allocation ratios for the current and alternative portfolios, the impact of current and alternative investment overlays on the pension assets and liabilities may be reflected. Moreover, the process described above may also be utilized to set other pension fund policies such as funding policy, benefits policy and actuarial methods and assumptions policy.

3. Pension Liability and Hedging

In the ongoing description, the terms hedged and unhedged, as well as pension liability has been extensively used; a number of issues should be discussed for clarity. First, the issue of pension liability specification is discussed. Next, after the liability is defined, the definition of hedged (matched) and unhedged (unmatched) liabilities is clarified.

3a. Calculating Pension Liabilities

A pension liability is the discounted value of a series of projected cash flows from benefit payments payable to plan participants and beneficiaries. The bulk of the payments are retirement benefits payable to surviving retirees. However, benefits may also be paid due to death, disability or employment turnover. The calculations of these benefits are prescribed in the pension plan document. Any anticipated changes to benefit provisions may be integrated into the calculations.

While the plan document dictates the benefit payable should the participant reach the required contingency (retirement, death, disability, turnover), the probability of the contingency actually occurring is also factored in the calculation. Rates of mortality, disability, turnover and retirement at individual ages are typical inputs. When calculating cash flows or liabilities at a future valuation date, inputs on assumed experience with respect to the above contingencies may also be required.

In addition to the above, the membership roster of the pension plan, including age, service, pay if needed, for active participants, and age, amount and type of benefits for retirees, beneficiaries and vested terminations may be needed for detailed calculation. Summarized scatters of the participants may be used for less accurate estimates. Assumptions on new participants with respect to pay and age may also be needed if liabilities at future valuation dates are calculated.

From these inputs, cash flows may be calculated using actuarial routines. Rather than being calculated, the cash flows may be direct inputs if provided by an external source such as the plan actuary.

With the cash flows available, discount rate or rates are then used to calculate the present value. In the pension actuarial field, there are established definitions of liabilities that are used for tax and accounting, each of which uses a pre-defined discount rate. For example, current liability is one liability used in calculating minimum employer contributions based on the Internal Revenue Code. The discount rate used in this current liability is announced by the Internal Revenue Code every month; the rates are currently tied to corporate bond yields, and use a four-year weighted averaging process. On the accounting end, the FASB prescribes the calculation of two liability definitions, the projected benefit obligation (PBO) and the accumulated benefit obligation (ABO) based on long-term yields of AA-rated bonds. The difference between PBO and ABO is that the PBO anticipates the increase in liabilities coming from the increase in compensation levels in the future, while the ABO is based on current compensation. Thus, an assumed salary increase is factored in when calculating cash flows for liabilities that include future pay increases by definition. Definitions of an "economic pension liability" are becoming common, where the discount rates are directly tied to government or corporate yield curves.

Given cash flows and discount rates for valuation at two different points in time, liabilities are calculated at both points of valuation. Liability returns over the period can then be calculated using actuarial formulae.

From the preceding discussion, there is a variety of choices in specifying the liability for the liability allocation method. The calculation of the liability allocation may be performed for multiple liability definitions.

In addition, a similar process may be used to calculate post-retirement benefits other than pensions. The method is also readily extended to other enterprise liabilities which can be modeled as future streams of cash flows, in the same manner as benefit cash flows for pension liabilities.

3b. Intuitive Notion of Hedging the Pension Liability

With the liability specified, the second issue of defining hedged and unhedged liabilities is discussed. Intuitively, one unit of a hedged liability would move one-for-one with the matching unit of asset. From a surplus viewpoint, the difference between a unit of asset that moves one-for-one with a unit of hedged liability will be zero or close to zero under all scenarios. Thus, the standard deviation or variance of pension surplus is zero or close to zero for the hedged liability and matching asset. Similarly, the standard deviations of other surplus measures such as surplus return (asset return less liability return) and funded ratio are also zero or close to zero for one unit of matched asset and liability.

While pension contribution and expense hedging would be desirable for most pension sponsors, mandated rules (IRS and FASB) make it difficult to hedge both at the same time, due to different discount rates between the two as well as differing mandated calculations. Pension expense by itself can be hedged using assets hedged to PBO liabilities. Current funding minimum contributions are difficult to hedge due to two different liability definitions which can impact contributions (one of which uses a fixed discount rate, while the other uses a 4-year weighting). To the extent that funding and accounting rules change so that expense and funding liabilities get closer plus unexpected deviations to funding or expense are tied more directly to unexpected changes in surplus (or deficit), then hedging for both liabilities becomes more feasible. In the current situation where liability definitions remain divergent, the remaining volatility may become a comparative measure in deciding between candidate portfolios for setting an investment strategy.

It should also be clarified that hedging has been generally directed at interest rate risk; i.e., the impact of unexpected changes in the discount rate used for calculating the pension liability. In fact, next year's pension surplus will likely have unexpected gains/losses because there are other factors that have not been hedged. Unhedged contingencies include unexpected inflation for PBO-like liabilities, and unexpected decrements (lower or higher mortality, disability, turnover and retirement). Inflation hedging may be feasible using Treasury Inflation Protected Securities (TIPS); mortality risk for retirees may be hedged by purchasing annuities.

Despite the above mentioned unhedged risks, unexpected changes in discount rate risk generally remain the predominant source of surplus volatility. Other unhedged contingencies typically result in relatively smaller deviations in the balance of assets relative to liabilities; however, it does require asset rebalancing to regain the interest rate hedge. While the discussion in this section on hedging concentrates on the interest rate risk, extensions to hedging other contingency risks will be readily apparent to those skilled in the art. Such extensions are intended to be within the scope of the present invention.

4. Calculation of Liability Allocation Ratio

Discussion follows on the calculation of the liability allocation ratio. Inputs to the calculation are discussed. An initial definition of liability allocation is first discussed, after which three alternative definitions are detailed: (a) Binary Liability Allocation, (b) Continuous Liability Allocation, and (c) Correlation-Based Liability Allocation.

4a. Inputs: Means, Standard Deviations and Covariances of Random Variables

There are two general sets of required inputs, one for the pension liability random variable and the other for the pension asset random variable.

The general method of calculating the liability cash flows was discussed in 3a. Cash flows may be detailed for every year in the future; they can also be grouped into one or more cash flow buckets, where the time horizon for each bucket is calculated from the time horizon of each of the component cash flow included in the bucket. For each bucket, there is an associated discount rate; this allows the collapsing of the pension liability into one present-value number.

In general, pension cash flows are deterministic; it is the discount rate that typically is treated as a random variable, resulting in volatility that is the focus of liability hedging. However, when the contingencies of survivorship, mortality, disability, turnover, wage inflation and retirement are treated as random variables, the cash flows become random variables. While the bulk of the discussion of the invention treats pension cash flows as deterministic, the extension to random variable cash flows is intended to be within the scope of the present invention.

Interest rate and yield modeling is well developed in the art (Rebonato, 1996). A variety of yield curve models may be used to provide the inputs for the plurality of discount rate random variables. For each cash flow or cash flow bucket, an input discount rate random variable used, specified by a defined expected discount rate and a defined standard deviation of discount rate, each discount rate having a covariance with respect to each every other discount rate of the plurality of discount rates.

In one aspect of the method, pension plan cash flows present-valued using the above corresponding discount rate random variables result in next period's pension liability random variable. The random variable of liability returns for each year in the period or each liability bucket can then be derived. Alternatively, the liability random variable may be a direct input, rather than a calculated input. The liability return may be modeled as the return of an appropriately chosen zero-coupon bond. A dollar of pension cash flow due 10 years out may be equated to a dollar of a 10-year zero coupon bond; the liability return may then set equal to the zero's investment return. Thus, in this aspect of the method, the random variable for that 10-year pension liability cash flow or return is set equal to that of the 10-year zero.

The derived or input random variable of liability returns for each liability or liability bucket may be specified by a defined expected liability return and a defined standard deviation of liability return, each liability return having a covariance with respect to each every other liability return of the plurality of pension liabilities.

On the asset side, parallel inputs involving asset classes or securities that are to be considered in implementing the liability allocations may be specified. In this aspect of the method, for each asset class or security, a return random variable is specified by a defined expected asset return and a defined standard deviation of asset return, each asset return having a covariance with respect to each every other asset return of the plurality of asset classes and securities. In addition, each asset has a specified covariance with respect to each every liability return of the plurality of pension liabilities.

Generally, only broad asset classes are included in the process. Typical equity classes that are used include US Equity, US Large Cap Equity, US Small Cap Equity, and International Equity. Usually, the asset class is designed to follow an industry benchmark (e.g., S&P 500 or Russell 1000 for US Large Cap Equity). On the bonds or fixed income side, typical asset classes are US Core Fixed Income, International Fixed Income, and Long Duration Bonds. Similarly, the bond class is designed to follow industry benchmark (such as the Lehman Aggregate Bond Index for US Core Fixed Income). In the liability allocation process, more detailed asset classes, even individual securities may be needed to achieve higher hedged liability ratio allocations, particularly in the fixed income class which is the a source of interest-rate 100% hedging instruments. As discussed earlier, a 10-year pension liability may be perfectly or close to perfectly hedged (against interest rate volatility) by an appropriately chosen 10-year zero coupon bond. Such bonds as well as other bonds capable of hedging each and every one of the other pension liabilities or buckets may be needed to achieve a 100/0 liability allocation (100% hedged, 0% unhedged). Interest rate swaps and futures as liability overlays (discussed below) may also be included as an alternative or compliment to the available securities.

4b. Alternative Inputs: Monte Carlo Simulations

Rather than the summary measures of statistical distributions listed above, an alternative aspect of the method may use as inputs a plurality of Monte Carlo Simulations for each of the required random variables in 4a. Among the plurality of Monte Carlo simulations that will be serve as inputs to the liability allocation would be:

1) benefit cash flows for each year in the future or each cash flow bucket
2) discount rate (or a bond yield from which the discount rate may be derived) for each item in (1)
3) liability returns for each liability or liability bucket
4) asset returns for each asset class or security
5) overlay asset (or liability) returns for each investment overlay strategy
6) other stochastic variables affecting assets or pension liabilities 5. Derivatives and Other Investment Overlays Overlay strategies are frequently employed as part of the pension plan's comprehensive investment policy. They can be as simple as employing active management (versus passive management) on selected asset classes such as US Small Cap equity, or they can be as complex as alpha transport strategies, which attempt to capture the excess return (alpha) alone, and not the base return (beta).

Overlays can also take the form of derivatives, futures and swaps. Purchasing equity put options protect the plan from extreme negative returns in the equity market. While the overlays are instruments bought and sold in the market, they may also be modeled as being overlaid upon pension liabilities. The combined effect on the pension plan results in surplus volatility (due to unexpected interest rate changes) being dampened or extinguished.

In one aspect of the method, an investment overlay in the liability allocation method may be treated as separate random variable with its own expected return, standard deviation and covariance with every other asset instrument. Additional or subtractive returns may then be factored into the portfolio return in the appropriate proportion. An alternative aspect of the method would be to directly adjust the return, standard deviation and covariance matrix of the asset (or liability class) that the overlay was intended to affect.

Should the inputs to the asset allocation process be in the mode of a plurality of Monte Carlo simulations (4b above), the investment overlays may modeled as separate investment simulations, or again alternatively, its additive or subtractive return may be integrated in the return simulations of the asset class the overlay was intended to affect.

Figure 4:
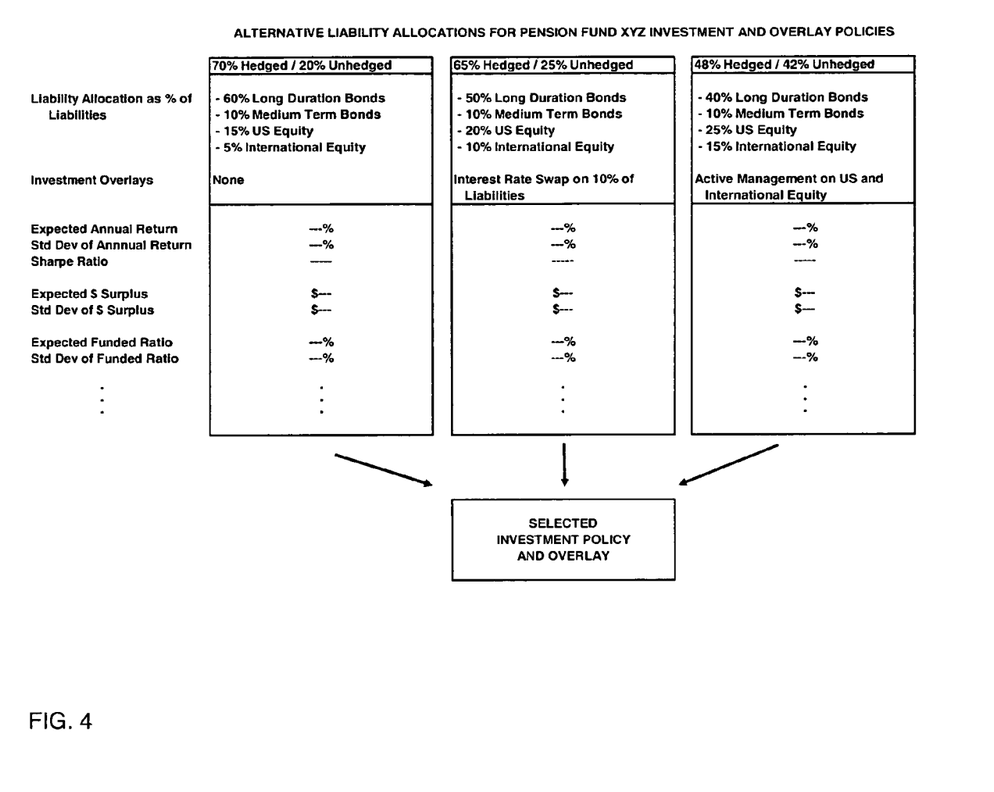
FIG. 4 depicts an example of the integration of investment overlay strategies over pension assets and liabilities for a given liability allocation.

Under asset allocation, a 70/30 asset allocated investment portfolio with an interest rate swap or future generally will remain categorized as a 70/30 portfolio. However, in one aspect of the method, the same interest rate swap or future will generally change the liability allocation ratio, likely increasing the hedged factor of the pension liability allocation. FIG. 4 shows an example of how derivative and overlay strategies may be integrated in the investment policy and strategy process using pension liability allocations.

6. Calculation of Pension Liability Allocation

In one aspect of the method, the calculation of the pension liability allocation for a given asset portfolio and a given pension liability, involves the calculation of two values, the first one indicative of the hedging/matching of pension assets and liabilities and the second value indicative of the "not-hedging"/mismatching of pension assets and liabilities.

The calculations of binary pension liability allocation, continuous liability allocation, quick liability allocation and alternative liability allocation definitions are discussed in the following sections.

6a. Binary Pension Liability Allocation

One aspect of the calculation of the binary pension liability allocation x/y is detailed here. The notion of a hedged pension liability was earlier defined as a unit of pension liability matched with a unit of pension asset, such that the pension surplus (unit of pension asset less unit of pension liability) would have a standard deviation of zero or close to zero. Generalizing over total liabilities, if x % of pension liabilities had corresponding assets, such that the standard deviation of its difference was zero or close to zero, then the liability allocation would have an x % hedged value. In this aspect of the binary definition, the remainder of assets (y % of total liabilities) would be considered unhedged, due to the fact that none of the remaining liabilities may be perfectly hedged with any remaining assets (standard deviation of their difference is significantly different from zero). Thus, the term binary liability allocation: anything other than perfect or close to perfect hedging is considered unhedged.

In this aspect of the method, from the discussion above, the sum of x % and y % is not necessarily 100%. Unlike the asset allocation ratio which always sums up to 100%, the sum of x and y of the pension liability allocation ratio adds up to the funded ratio (total pension assets over total pension liabilities) in this aspect of the method. The liability allocation adds up to 100% only if pension liabilities equal pension assets in this aspect of the method.

Other measures such as surplus return (asset return less liability return) and funded ratio (ratio of pension assets to pension liabilities) may be used as an alternative to pension dollar surplus above. Moreover, other risk measures such as variance, semi-variance and other downside-risk measures may be implemented in lieu of standard deviation. While the bulk of the discussion above uses standard deviation of pension plan dollar surplus as the determining metric for the pension liability allocation, the extension to other surplus-related variables and other risk measure definitions are intended to be within the scope of the present invention.

6b. Continuous Pension Liability Allocation

The binary pension liability allocation calculated in the aspect of the method in 6a was simple, but treated all assets that were not 100% hedged to liabilities in the same manner. For example, a pension plan has a unit of a 10-year pension liability, and single units of a 5-year zero coupon bond, a 10-year coupon bearing bond, a unit of US equity, a unit of international equity and a unit of emerging markets equity. Since none of the units of assets hedge the liability perfectly, the aspect of the binary calculation described in 6a would lump all the units as unhedged, although each one differs in its volatility as well as its correlation with the liability. The units of other bonds clearly have volatilities similar to the liability, while the equities would have higher volatilities. The bonds would also have higher correlations to the pension liability relative to equities. Within equities, US equity would have higher correlation to the liability and lower volatility compared to emerging markets equity.

While it is clear that none of the assets hedge the 10-year liability perfectly, it is also obvious that there are varying levels of "unhedged-ness". For an asset unit that is not a perfect hedge to the liability, the approach in this aspect of the continuous pension liability allocation calculation is to assign a fraction of the unit to the hedged portion of the ratio, and the remaining fraction to the unhedged portion. In this aspect of the method, the fractional allocation is detailed below.

A continuous scale is needed to implement the fractional apportionment in this aspect of the method. A typical metric to base the scale on may be the standard deviation of pension plan dollar surplus. One end of the scale may be anchored at zero standard deviation of pension plan dollar surplus which would then assign a 100% hedge factor (or 0% unhedged factor). In this aspect of the continuous liability allocation method, two additional specifications are required to complete the calculation of the continuous pension liability allocation: (1) the anchoring value at the other end of the scale that would assign a 0% hedge factor (or 100% unhedged factor), and (2) the transformation function from standard deviation of pension plan dollar surplus to the hedged/unhedged factors for values in-between the two anchors.

For clarity, the anchor discussed in (1) above will be termed the scale maximum standard deviation (of pension plan dollar surplus). One possible method of setting the scale maximum standard deviation would be to set a defined value which practitioners would gauge as nearing the higher end of practicable volatility. Rather than specifying the value of the scale maximum standard deviation, it may also be derived by specifying an asset portfolio that is deemed "100% unhedged". For example, a 100% US Equity portfolio can be specified as being completely unhedged with the pension plan liability; this portfolio's calculated standard deviation of pension plan dollar surplus is then set as the scale maximum standard deviation. Moreover, the portfolio need not be determined by an actual asset allocation; alternatively, it may be specified by setting a target asset return, standard deviation of return and covariances with the pension liabilities returns.

Continuing with this aspect of the method, with the anchor values set, the transformation function for intermediate values will be specified. A typical transformation would be a simple linear function. That is, in this aspect of the method, the unhedged factor y % of any asset portfolio under consideration is set equal to the ratio of that portfolio's standard deviation of pension plan dollar surplus over the maximum scale standard deviation set in (1) above. Should the portfolio's standard deviation of dollar surplus exceed the maximum scale standard deviation, the ratio may be capped at the ratio of total plan assets to total plan liabilities. Finally, in this aspect of the continuous pension liability allocation method, the hedge factor x % of the same portfolio is then set equal to the ratio of total plan assets over total plan liabilities less the unhedged factor y %.

While the discussion above uses standard deviation of pension plan dollar surplus as the determining metric for the pension liability allocation, the extension to other surplus-related variables and other risk measure definitions are intended to be within the scope of the present invention as defined in the appended claims. Moreover, while practicable specifications regarding (1) and (2) above have been discussed, extensions of (1) and (2) will be readily apparent to those skilled in the art. Such extensions are intended to be within the scope of the present invention.

6c. Quick Pension Liability Allocation

A calculation specification for pension liability allocation under this section is intended to be a quick, initial approximation relative to the more-detailed values in (6a) and (6b). This is especially useful where there is only one (or a few) liability bucket(s).

In discussing this aspect of the method, for simplicity, assume that there is one pension liability bucket. In this aspect of the method, the only required inputs are the correlations of the asset class or security returns with the liability return, plus the asset allocation weights (percentage relative to pension liabilities) for the asset portfolio under consideration.

In this aspect of the method, the hedge factor x of the liability allocation x/y for the particular portfolio under consideration is equal to the sum of products of (a) the correlation of each asset class or security return with the pension liability return and (b) the corresponding asset allocation weight (percentage relative to pension liabilities), over the entire asset portfolio. The unhedged factor y % in this aspect of the method is then equal to the ratio of total assets to total liabilities less the hedge factor x %.

A second calculation alternative for the quick pension liability allocation is to use the complimentary factor equal to unity less correlation of asset class/security return to liability return, rather than the correlation itself, in the sum of product calculations. In this aspect of the method, the sum of products is then assigned to the unhedged factor y %, and the hedged factor x % is calculated as the ratio of total assets to total liabilities less the unhedged factor y %.

In situations where there is more than one liability bucket, the above method may be generalized by additional inputs of covariances of asset returns with the additional liability bucket. Moreover, an optimization process may be used to ascertain the optimal allocation of assets to multiple available liability buckets, such that the hedge ratio x % is maximized for the specific portfolio under consideration. In one aspect of the method, the optimization process will have a constraint that any liability bucket cannot be allocated to assets beyond 100% of its value; that is, the liability bucket should not overflow with assigned assets in this aspect of the method.

While the discussion above uses correlations of asset returns with liability returns as the determining metric for the quick pension liability allocation, the extension to other surplus-related variables and other risk measure definitions are intended to be within the scope of the present invention as defined in the appended claims. Moreover, while two practicable specifications regarding the treatment of the correlation factor in the sum of products calculation have been discussed, extensions will be readily apparent to those skilled in the art. Such extensions are intended to be within the scope of the present invention.

6d. Other Alternative Definitions of Pension Liability Allocations

While the discussion here detailed alternative definitions of pension liability allocation, extensions to related definitions will be readily apparent to those skilled in the art. Such extensions are intended to be within the scope of the present invention.

7. Investment Overlays in Pension Liability Allocation Calculations

Investment overlay strategies are readily integrated into the calculation of the pension liability allocation ratios. The calculations with overlays can be performed as described in (6a), (6b), (6c) and (6d), after the impact of the overlay has been factored in the inputs as discussed in (5). For example, the impact of an interest rate swap overlaid on say, US equity will need to be factored in the correlation of US equity (with overlay) with the pension liability (hopefully higher correlation compared to that without the overlay).

Clearly, investment strategy overlays (especially those impacting interest rates) have the potential of significantly affecting the calculated pension liability allocations. This result differs with the asset allocation ratio which generally is not be impacted by such investment overlays. The invention intends to include the extension of investment overlays and derivatives in the calculation of pension liability allocations described in (6a), (6b), (6c) and (6d).

8. Pension Liability Allocation Efficient Frontier

With the pension liability allocations defined, the process of using liability allocations to select alternative portfolios, strategies and policies may be extended to optimization routines. Efficient frontier generation is generally used to consider alternative asset portfolios. Typical "asset-only" efficient frontiers are generated using an objective function of minimizing risk, say standard deviation of annual returns, for a given level of reward, say expected annual return (or maximizing expected annual return for a given level of standard deviation of annual returns). Inputs consist of, for each asset class or security, (1) an expected asset return, (2) a standard deviation of asset return, and (3) a covariance for each asset return with respect to each every other asset return of the plurality of asset classes and securities. Additional constraints involving asset class weightings are typically employed.

Figure 5:
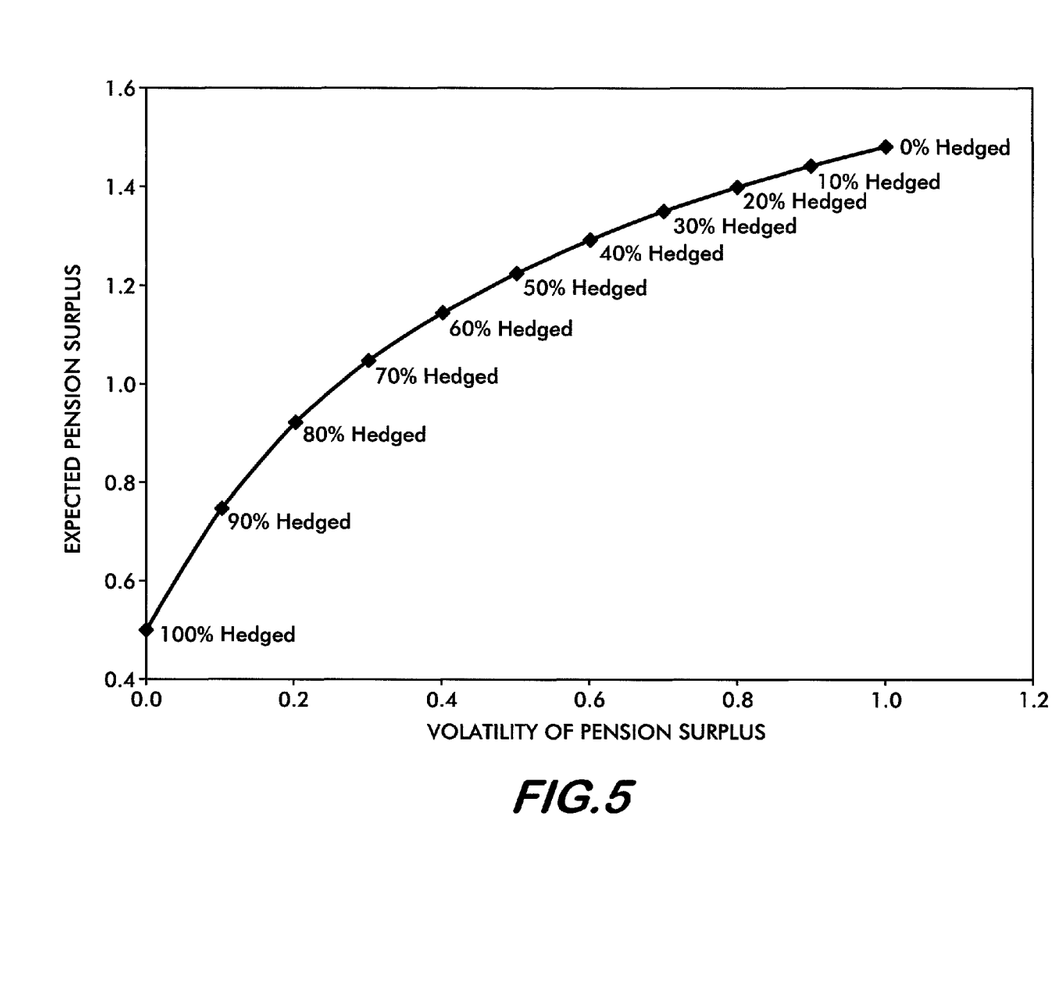
FIG. 5 depicts an exemplary liability allocation efficient frontier.

The invention includes the method of generating efficient frontiers, hereafter referred to as a pension liability allocation efficient frontier, as described above, but innovated by the use of the pension liability allocation calculation as an objective function and/or constraints in the optimization process. Additional inputs with respect to liability-side random variables as specified in (4a) may be required. A plurality of Monte Carlo simulations as described in (4b) may also be used as input for the optimization. FIG. 5 shows an example of a pension liability allocation efficient frontier, where the objective function is minimizing the standard deviation of pension plan dollar surplus, for a given level of expected pension plan dollar surplus, with the constraint of the portfolio satisfying specified pension liability allocation targets from 0% hedged/100% unhedged to 100% hedged./0% unhedged.

While the example above uses expected dollar surplus, standard deviation of dollar surplus and pension liability allocation targets in the objective function and the constraints of the optimization process, extensions to alternative risk and reward definitions, innovated by the use of pension liability allocations in the objective function and/or constraints in the optimization process, are intended to be within the scope of the invention.

9. Further Discussion on the Use of Pension Liability Allocations in Setting Investment Policy, Overlay Strategy and Other Pension Fund Policies Section 2 outlined the method of pension liability allocation in the process of setting investment policy for a pension plan. This method of setting investment strategy and policy, including investment overlays, by using at least in part pension liability allocations are claimed within the scope of the present invention as defined in the appended claims.

Figure 6:
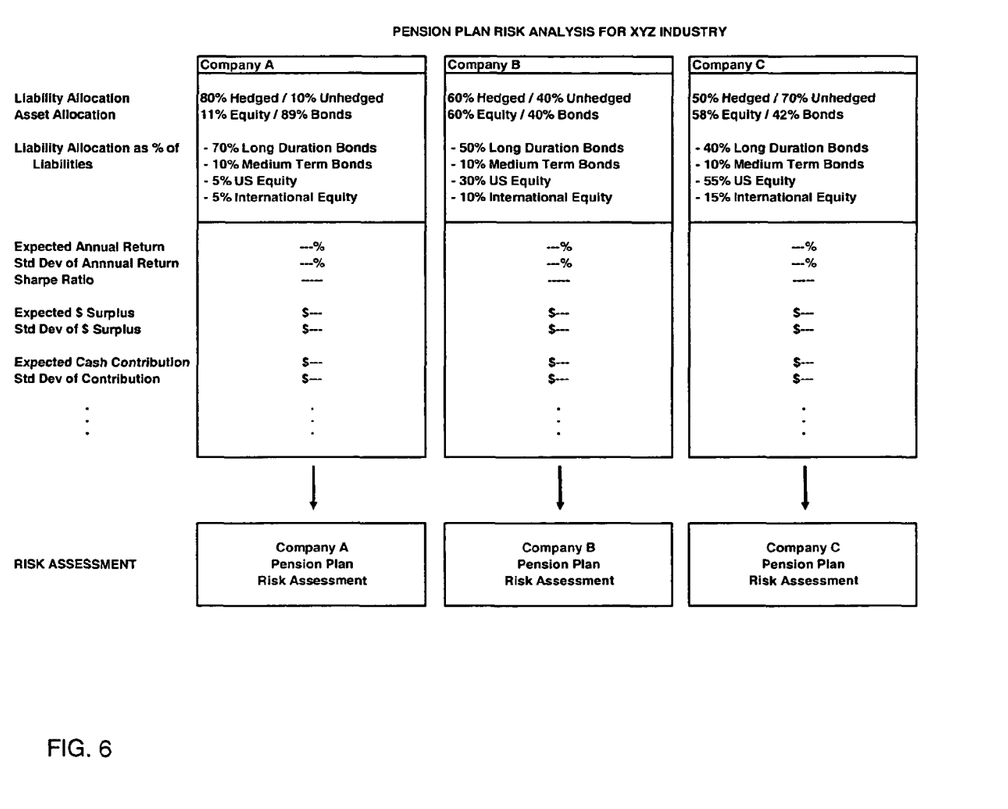
FIG. 6 depicts an example of the process of evaluating several pension plans using calculated liability allocations, as well as other metrics.

Pension plan sponsors also perform analysis on other pension plan-related issues, such as revising benefit plan provisions, setting employer contribution policy and selecting actuarial assumptions and methods. The use of pension liability allocations in such analyses are intended to be within the scope of the present invention as defined in the appended claims 10. Use of Pension Liability Allocations in Pension Plan Risk Assessment by Other Interested Parties The underfunded status of pension plans and the potential negative impact on the enterprise sponsoring the plans have led other interested policies in evaluating the risk presented by the pension plan(s) of the enterprise. Such interested parties may use the liability allocation method in evaluating one or more pension plans of the entities they monitor. Examples are:

a) Stock and bond analysts evaluating corporate pension plan risk of companies within the industries or sectors they cover. FIG. 6 provides an example how an analyst might assess and compare pension risk between corporations in an industry, using pension liability allocations.

b) Credit rating agencies evaluating corporate and public pension plans and their impact on the credit worthiness of the entities they follow.

c) Regulatory agencies such as the Pension Benefit Guaranty Corporation (PBGC) in the US and the Pension Protection Fund in the UK which are responsible for guaranteeing pension payments in their respective private sectors.

d) Accounting standards board such as the FASB and GASB that is charged with promulgating the proper disclosure of all sources of enterprise risk including pensions.

The use of pension liability allocations for pension risk analyses for plans of one or multiple entities are intended to be within the scope of the present invention as defined in the appended claims 11. Use of Liability Allocation Method in Other Enterprise Liabilities Corporations and public entities offer benefits other than pensions to employees who retire from their employment. Examples of these are post-retirement medical and life insurance benefits. Employers face similar issues in terms of funding these liabilities as well as disclosing in their financial statements. It is common for investment pools to accumulate as sponsors attempt to pre-fund benefits in the same manner that they do for pension benefits. The appropriate investment of such funds present the same need for the application of the liability allocation method as in pensions. Extensions of the liability allocation method to post-retirement benefit plans other than pensions are intended to be within the scope of the present invention as defined in the appended claims.

Moreover, enterprises may have other liabilities outside of the benefit liabilities discussed. An enterprise can easily have other liabilities consisting of future uncertain cash flows that are contingent on a number of variables that may be hedged in varying degrees. The enterprise may likely pre-fund this liability with a pool of assets. The extensions of the liability allocation method to such other enterprise liabilities and assets will be readily apparent to those skilled in the art and are intended to be within the scope of the present invention as defined in the appended claims.

12. Computer Systems

In addition to the method, a computer software product for use on a computer system to implement the method is developed. The software is designed to perform the steps for:

a) calculating the liability allocation for any input asset portfolio given the pension plan liabilities and other inputs described in the Detailed Description of the Invention, using any one or all of the definitions of liability allocation described in the Detailed Description b) calculating the portfolio allocation or portfolio allocations to asset classes that satisfy a target liability allocation, potentially with additional constraints, given the pension plan liabilities and other inputs described in the Detailed Description of the Invention c) calculating the liability allocation efficient portfolio given an objective function and additional constraints, given the pension plan liabilities and other inputs described in the Detailed Description of the Invention d) calculating liability allocations for multiple asset portfolios, each with corresponding pension liabilities, given other inputs described in the Detailed Description of the Invention e) displaying the calculated liability allocations together with other input or calculated portfolio measures of risk, reward and efficiency ratios for a multitude of liability or asset allocations 13. Extensions of the Method Although the invention has been described with reference to the specific techniques for calculating pension liability allocations, the invention is not limited to reliance on such techniques. Various modifications, additions or improvements may be devised or recognized by those skilled in the art; and such modifications, additions or improvements are properly considered as extensions of the method that are within, or equivalent to, the scope of the invention as defined by the appended claims.

I claim:

1. A computer-implemented method of allocating assets in a defined benefit pension plan with a set of pension liabilities from required benefit payments to plan participants as defined by a plan specification of the defined benefit pension plan including pension benefits and other post-retirement benefits, a plurality of pension assets with asset classes and security weightings representative of amounts of the pension assets invested over the plurality of asset classes and security weightings including stocks and bonds, the method being performed on a computer system having an output device, comprising:

(A) calculating by the computer system the set of pension liabilities including calculating each of the required benefit payments using discounted values based on rates of mortality, morbidity, disability, withdrawal, turnover, retirement and a membership roster of the defined benefit pension plan wherein the required benefit payments are based on fixed deterministic assumptions or based on stochastic random variable assumptions;

(B) calculating by the computer system a first calculated value indicative of a first set of pension assets that are matched with the set of pension liabilities wherein a unit of matched pension assets moves with a unit of pension liabilities of the set of pension liabilities and wherein the calculating of the first calculated value includes;

(i) determining for each of the asset classes and security weightings in the first set of pension assets an expected asset return and a variance of asset return, (ii) determining for each of the asset classes and security weightings in the first set of pension assets a covariance of asset return with respect to every other asset return over the plurality of asset classes and security weightings, (iii) determining for each required benefit payment in the set of pension liabilities an expected liability return and a variance of liability return, (iv) determining for each required benefit payment in the set of pension liabilities a covariance of liability return with respect to every liability return of every other required benefit payment in the set of pension liabilities, (v) determining for each of the asset classes and security weightings in the first set of pension assets a covariance of asset return with respect to the liability return of each required benefit payment in the set of pension liabilities; and (vi) multiplying a matrix of variances and co-variances in B(i) to B(v) with the matrix of corresponding weightings of each of the required benefit payments in the set of pension liabilities and corresponding security weightings of each of the asset classes and security weightings in the first set of pension assets;

(C) calculating by the computer system a second calculated value indicative of a second set of pension assets that are not fully matched with the set of pension liabilities wherein a unit of the non-fully matched pension assets does not move with a unit of pension liabilities of the set of pension liabilities and wherein the calculating of the second calculated value includes;

(i) determining for each of the asset classes and security weightings in the second set of pension assets an expected asset return and a variance of asset return, (ii) determining for each of the asset classes and security weightings in the second set of pension assets a covariance of asset return with respect to every other asset return over the plurality of asset classes and security weightings, (iii) determining for each of the required benefit payments in the set of pension liabilities an expected liability return and a variance of liability return, (iv) determining for each of the required benefit payments in the set of pension liabilities a covariance of liability return with respect to every liability return of every other required benefit payment in the set of pension liabilities, (v) determining for each of the asset classes and security weightings in the second set of pension assets a covariance of asset return with respect to the liability return of every required benefit payment in the set of pension liabilities; and (vi) multiplying a matrix of variances and covariances in C(i) to C(v) with the matrix of corresponding weightings of each of the required benefit payments in the set of pension liabilities and corresponding weightings of each of the asset classes and security weightings in the second set of pension assets;

(D) wherein the calculating of the first and second calculated values representative of the first and second sets of pension assets includes applying to specified portions of the first and second sets of pension assets each of;

(i) a binary liability allocation method wherein any asset class or security that is not completely matched is assigned as completely unmatched, (ii) a continuous liability allocation method wherein any asset class or security that is not completely matched is assigned partially as matched and partially as unmatched in accordance with the extent of matching based on a defined volatility metric having a first anchor value for assigning zero percent matching, a second anchor value for assigning one-hundred percent matching, and a transformation function for transforming from the defined volatility metric to a matching factor for assigning intermediate values of matching, and (iii) a correlation-based liability allocation method wherein each of the asset classes and security weightings is assigned as matched or unmatched in accordance with the correlation of each asset return within the set of pension assets to the liability return of the set of pension liabilities and in accordance with the corresponding weightings of each of the asset classes and security weightings;

(E) calculating by the computer system a pension liability allocation ratio by dividing one of the first and second calculated values by the other of the first and second calculated values in accordance with step (D);

(F) calculating by the computer system a further first calculated value and a further second calculated value in accordance with steps (A)-(E) to provide differing asset class and security weightings representative of differing amounts of the pension assets invested over the plurality of asset classes and security weightings;

(G) determining a pension liability allocation efficient frontier in accordance with;
  (i) calculating the pension liability allocation ratio within an optimization objective function,
  (ii) calculating the pension liability allocation ratio as a constraint to the optimization objective function;
  wherein an optimized asset class and security weighting are determined by an optimization process; and (H) outputting a representation of the optimized asset class and security weighting on the output device.

2. The method of claim 1, further comprising:

selecting a plurality of entities each having a defined benefit pension plan;

calculating a pension liability allocation ratio for each entity in the plurality of entities; and evaluating and comparing defined benefit pension plans of the plurality of entities at least in part on the basis of the pension liability allocation ratio.

* * * * *